United States Patent
Ohtani et al.

(10) Patent No.: US 11,905,417 B2
(45) Date of Patent: Feb. 20, 2024

(54) ANTHRAQUINONE COMPOUND, LIQUID CRYSTAL COMPOSITION FOR DIMMING INCLUDING SAID COMPOUND, AND DIMMING ELEMENT

(71) Applicant: Nippon Kayaku Kabushiki Kaisha, Tokyo (JP)

(72) Inventors: Kohei Ohtani, Tokyo (JP); Hitomi Muto, Tokyo (JP); Saori Suzuki, Tokyo (JP); Takashi Yoshimoto, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/012,254

(22) PCT Filed: Jun. 1, 2021

(86) PCT No.: PCT/JP2021/020850
§ 371 (c)(1),
(2) Date: Dec. 22, 2022

(87) PCT Pub. No.: WO2021/261181
PCT Pub. Date: Dec. 30, 2021

(65) Prior Publication Data
US 2023/0340268 A1    Oct. 26, 2023

(30) Foreign Application Priority Data
Jun. 25, 2020   (JP) .................................. 2020-109245

(51) Int. Cl.
G02F 1/1333 (2006.01)
C09B 1/58 (2006.01)
C09K 19/60 (2006.01)
G02F 1/137 (2006.01)

(52) U.S. Cl.
CPC ............ C09B 1/585 (2013.01); C09K 19/603 (2013.01); G02F 1/13737 (2013.01); G02F 2202/043 (2013.01)

(58) Field of Classification Search
CPC ...... C09K 19/52; C09K 19/603; C09B 1/585; G02F 1/1333; G02F 1/13737; G02F 2202/043
See application file for complete search history.

(56) References Cited

U.S. PATENT DOCUMENTS

| | | | |
|---|---|---|---|
| 4,232,949 A | 11/1980 | Huffman | |
| 4,405,211 A | 11/1983 | Harrison et al. | |
| 2018/0307077 A1 | 10/2018 | Miura et al. | |

FOREIGN PATENT DOCUMENTS

| | | | | |
|---|---|---|---|---|
| DE | 201689 | * | 8/1983 | ............... C09K 3/34 |
| JP | 55-116785 A | | 9/1980 | |
| JP | 57-73067 A | | 5/1982 | |
| JP | 61-87756 A | | 5/1986 | |
| JP | 63-501512 A | | 6/1988 | |
| JP | 3-47392 A | | 2/1991 | |
| JP | 4-264193 A | | 9/1992 | |
| JP | 10-316970 A | | 12/1998 | |
| JP | 2010-215771 A | | 9/2010 | |
| JP | 2011-190314 A | | 9/2011 | |
| JP | 2018-205746 A | | 12/2018 | |
| WO | WO2021/261181 A1 | * | 12/2021 | ............. C09K 19/60 |
| WO | WO2022/158493 A1 | * | 7/2022 | ............. C09K 19/60 |

OTHER PUBLICATIONS

International Search Report and Written Opinion dated Aug. 24, 2021 in corresponding PCT application No. PCT/JP2021/020850.

* cited by examiner

*Primary Examiner* — Geraldina Visconti
(74) *Attorney, Agent, or Firm* — NIELDS, LEMACK & FRAME, LLC.

(57) ABSTRACT

The present invention relates to an anthraquinone compound represented by formula (1) (in formula (1), R1 represents a C1-9 alkyl group and R2 represents a C1-8 alkyl group): a yellow dichroic pigment that includes this compound; a liquid crystal composition for light control that contains this yellow dichroic pigment and a liquid crystal material; and a light control element that uses this composition.

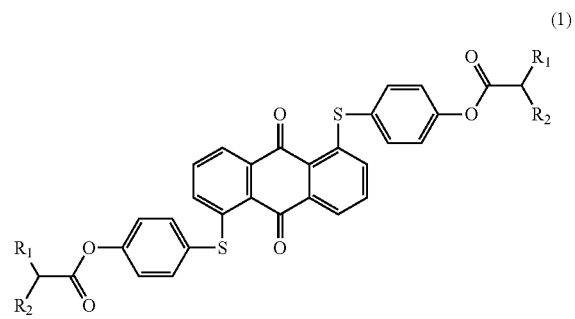

(1)

16 Claims, No Drawings

ANTHRAQUINONE COMPOUND, LIQUID CRYSTAL COMPOSITION FOR DIMMING INCLUDING SAID COMPOUND, AND DIMMING ELEMENT

TECHNICAL FIELD

The present invention relates to a novel anthraquinone compound, a yellow dichroic dye that comprises the compound, a liquid crystal composition for light control that contains the dichroic dye, and a light control element.

BACKGROUND ART

In vehicles such as trains and automobiles, and windows, doors, partitions, and the like of buildings such as business buildings and hospitals, various devices related to light control films for controlling transmission of external light have been proposed for the purpose of protecting privacy and the like (see Patent Literatures 1 and 2). Examples of such light control films include ones utilizing a liquid crystal. Usually, the liquid crystal light control film can block a field of view by controlling transmission and scattering of light depending on whether or not a voltage is applied, but cannot block light itself, and therefore glare tends to increase due to light scattering. Hence, for the purposes of reducing glare, improving contrast, and the like, attempts have been made to use a dye as a material of a light control panel (see Patent Literatures 3 and 4). For example, in a case where such a light control panel is used for a window glass of an automobile, it is required to obtain not only good visibility without fogging at the time of transparency, but also deep coloring at the time of light shielding.

Dichroic dyes have been commonly known as the dyes to be used in liquid crystal light control films. As a light control element using a liquid crystal composition containing a dichroic dye, a GH (guest-host) type has been known, and various dichroic dyes have been proposed.

Such dichroic dyes are required to have not only contrast when used as an element, but also light resistance, UV resistance, heat resistance, and the like, and efforts have been made to improve these characteristics. On the other hand, in a liquid crystal composition containing a dichroic dye, it is necessary to contain a large amount of the dichroic dye in the liquid crystal composition in order to obtain a large dichroic ratio. However, if the compatibility (solubility) of the dichroic dye with components of the liquid crystal composition is low, there is a problem that the dichroic dye is precipitated at room temperature or lower temperatures, the contrast is lowered, and sufficient performance as a light control element cannot be achieved. For example, Patent Literatures 5 and 6 disclose dyes excellent in light resistance and heat resistance, or order parameters and the like, but the dyes in Patent Literatures 5 and 6 are insufficient in the compatibility with components of the liquid crystal composition.

As one of methods for improving the compatibility of a dichroic dye with a liquid crystal composition, it has been generally known to make the molecular structure asymmetric as disclosed in Patent Literature 7. However, such a method is disadvantageous in that the number of steps increases, an unfavorable mixture is likely to be created in a synthesis step, and column chromatography purification using silica gel is essential in order to increase the purity. As a result, this method is not preferable for industrially producing a liquid crystal composition containing a dichroic dye because there are risks of a decrease in yield and complication of operation steps.

CITATION LIST

Patent Literature

PATENT LITERATURE 1: JPS63-501512A
PATENT LITERATURE 2: JPH3-47392A
PATENT LITERATURE 3: JP2018-205746A
PATENT LITERATURE 4: JP2011-190314A
PATENT LITERATURE 5: JPH4-264193A
PATENT LITERATURE 6: JPS57-73067A
PATENT LITERATURE 7: JPS61-87756A

SUMMARY OF INVENTION

Technical Problem

A first object of the present invention is to provide a novel anthraquinone compound.

A second object of the present invention is to provide: a dichroic dye, the production process of which is simple, the solubility and coloring power of which are sufficient with a liquid crystal composition, and which is excellent in contrast; a liquid crystal composition for light control that contains the dichroic dye, which is excellent in light shielding performance; and a light control element containing a cured product of the composition.

Solution to Problem

As a result of intensive studies to achieve the first object, the present inventors have succeeded in obtaining a novel anthraquinone compound. In addition, the present inventors have found that the second object can be achieved by using this novel compound.

That is, aspects of the present invention are as follows.

[1]. A compound represented by formula (1):

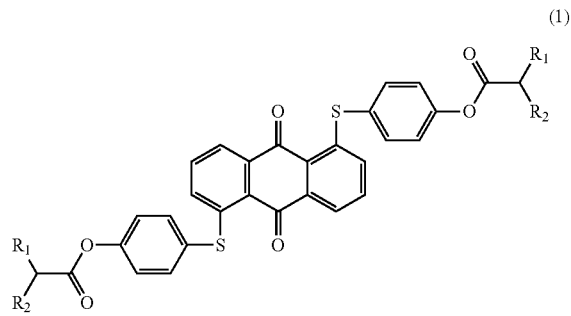

wherein $R_1$ represents a C1-9 alkyl group and $R_2$ represents a C1-8 alkyl group.

[2]. The compound according to [1], wherein a total of the number of carbon atoms in the alkyl group represented by $R_1$ and the number of carbon atoms in the alkyl group represented by $R_2$ is 6 to 14.

[3]. The compound according to [2], wherein $R_1$ is a C4-8 alkyl group and $R_2$ is a C2-6 alkyl group.

[4]. A yellow dichroic dye comprising the compound represented by the formula (1) according to [1].

[5]. A liquid crystal composition for light control, comprising the yellow dichroic dye according to [4] and a liquid crystal material.

[6]. The liquid crystal composition for light control according to [5], further comprising a photocurable compound and a photopolymerization initiator.

[7]. The liquid crystal composition for light control according to [5] or [6], further comprising a red dichroic dye and a blue dichroic dye.

[8]. A cured product of the liquid crystal composition for light control according to [6] or [7].

[9]. A light control element in which the liquid crystal composition for light control according to [5] or the cured product according to [8] is sandwiched between a pair of substrates, at least one of which is a transparent substrate having a transparent electrode.

[10]. The light control element according to [9], wherein both of the pair of substrates are transparent substrates having a transparent electrode.

[11]. The light control element according to [9] or [10], which is used for being mounted on a vehicle.

[12]. The light control element according to [9] or [10], which is used for a building material.

Advantageous Effects of Invention

The liquid crystal composition for light control of the present invention can stably maintain a high dye concentration at room temperature and lower temperatures. In addition, a light control element excellent in solubility and contrast can be obtained by using the composition.

DESCRIPTION OF EMBODIMENTS

Hereinafter, the present invention will be described in detail.

The compound (anthraquinone compound) of the present invention is represented by the following formula (1).

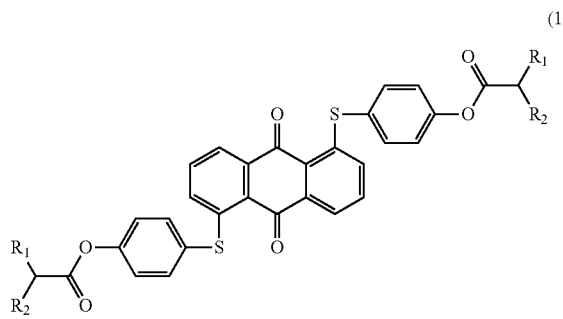

(1)

In the formula (1), $R_1$ represents a C1-9 alkyl group and $R_2$ represents a C1-8 alkyl group.

The C1-9 alkyl group represented by $R_1$ in the formula (1) may be linear or branched. Specific examples of $R_1$ include a methyl group, an ethyl group, an n-propyl group, an iso-propyl group, an n-butyl group, an iso-butyl group, a sec-butyl group, a t-butyl group, an n-pentyl group, an iso-pentyl group, a neo-pentyl group, a t-pentyl group, a hexyl group, a heptyl group, an octyl group, and a nonyl group.

The C1-9 alkyl group represented by $R_1$ in the formula (1) may be preferably a C2-9 alkyl group, and more preferably an ethyl group, an n-propyl group, an n-butyl group, an n-pentyl group, a hexyl group, a heptyl group, an octyl group, or a nonyl group. The C1-9 alkyl group represented by $R_1$ in the formula (1) may be more preferably a C4-8 alkyl group, and even more preferably an n-butyl group or an octyl group.

The C1-8 alkyl group represented by $R_2$ in the formula (1) may be linear or branched. Specific examples of $R_2$ include a methyl group, an ethyl group, an n-propyl group, an iso-propyl group, an n-butyl group, an iso-butyl group, a sec-butyl group, a t-butyl group, an n-pentyl group, an iso-pentyl group, a neo-pentyl group, a t-pentyl group, a hexyl group, a heptyl group, and an octyl group.

The C1-8 alkyl group represented by $R_2$ in the formula (1) may be preferably a C1-7 alkyl group, and more preferably a methyl group, an ethyl group, an n-butyl group, an n-pentyl group, a hexyl group, or a heptyl group. The C1-8 alkyl group represented by $R_2$ in the formula (1) may be more preferably a C2-6 alkyl group, and even more preferably an ethyl group, an n-butyl group, or a hexyl group.

In the formula (1), the total of the number of the carbon atoms in the alkyl group represented by $R_1$ and the number of the carbon atoms in the alkyl group represented by $R_2$ may be preferably 3 to 16, and more preferably 6 to 14.

Preferable specific examples of the compound represented by the formula (1) include the following compounds.

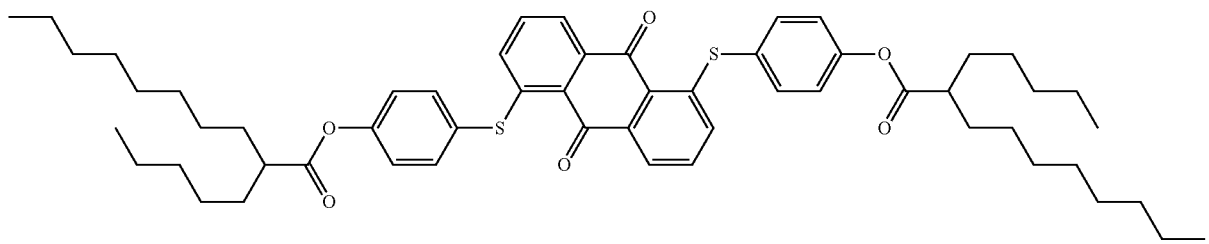

No.1

-continued
No.2
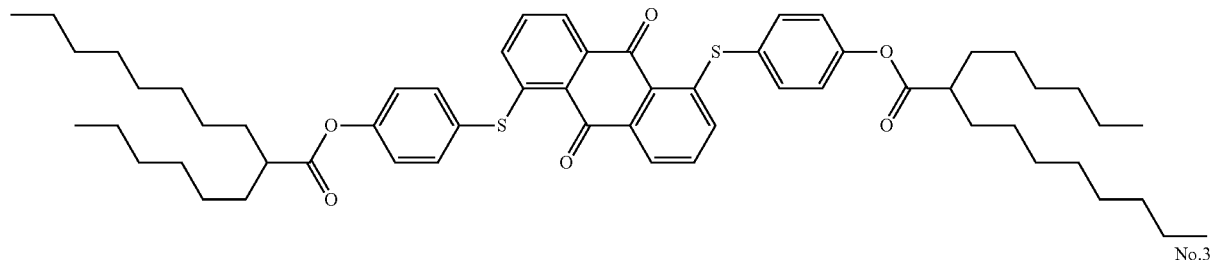
No.3
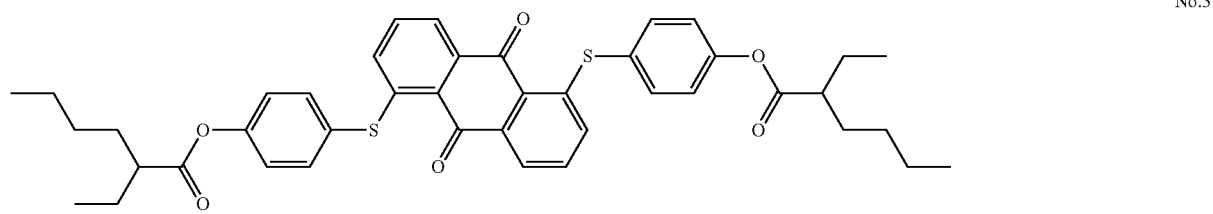
No.4
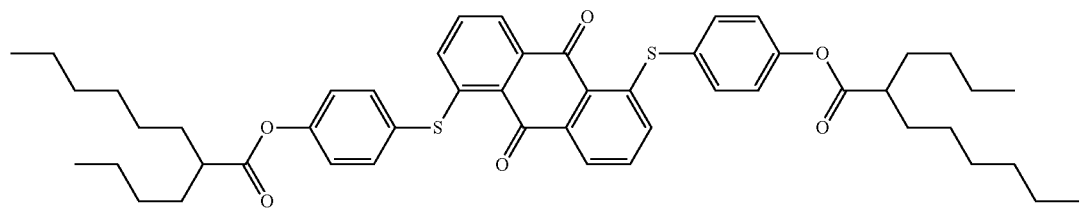
No.5
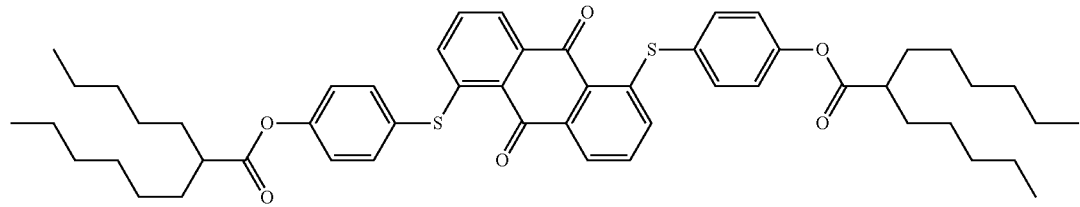
No.6
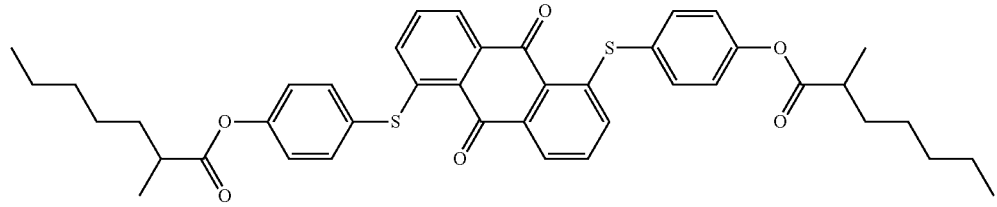
No.7
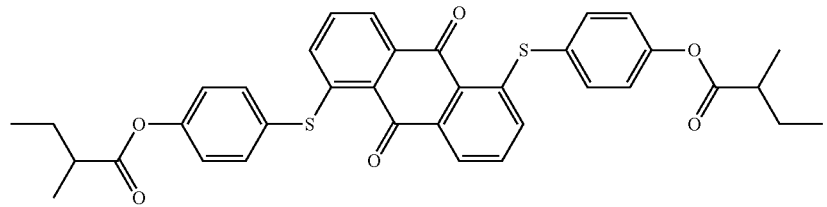

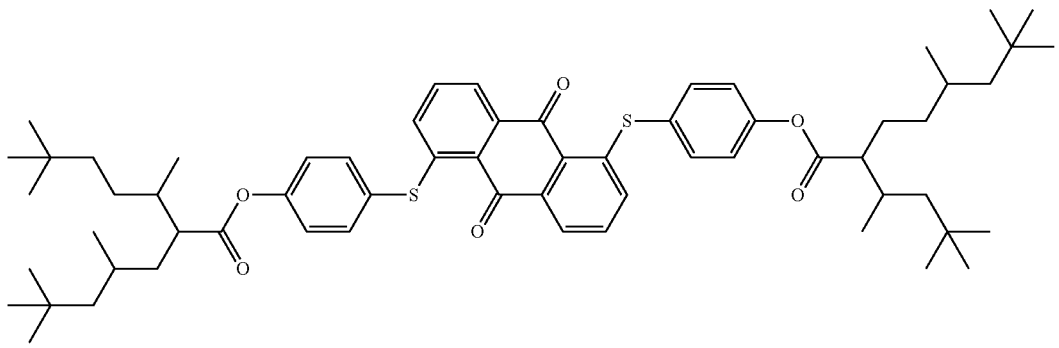

No.8

The compound represented by the above formula (1) can be produced, for example, as follows.

1,5-Dichloroanthraquinone and 4-hydroxybenzenethiol are stirred in an organic solvent, a base such as potassium carbonate is added thereto, and the mixture is heated to 60 to 100° C. The obtained compound, a corresponding carboxylic acid, and dicyclohexylcarbodiimide are dissolved in dichloromethane, 4-dimethylaminopyridine is added thereto, and the mixture is stirred at room temperature. Thereafter, purification by silica gel column chromatography is performed.

The yellow dichroic dye of the present invention that comprises the compound represented by the formula (1) may or may not contain a yellow dichroic dye other than the compound represented by the formula (1). The yellow dichroic dye that can be used in combination in the compound represented by the formula (1) is not particularly limited as long as it is a yellowish dichroic dye.

The content of the compound represented by the formula (1) in the yellow dichroic dye of the present invention is not particularly limited as long as the effects of the present invention are not impaired, but may be preferably 50% by mass or more and 100% by mass or less (or less than 100% by mass), more preferably 70% by mass or more and 100% by mass or less (or less than 100% by mass), and even more preferably 80% by mass or more and 100% by mass or less (or less than 100% by mass).

The liquid crystal composition for light control of the present invention (hereinafter, it is also simply referred to as the "composition of the present invention") contains a yellow dichroic dye comprising the anthraquinone compound represented by the formula (1) and a liquid crystal material.

The content ratio of the yellow dichroic dye (which comprises the anthraquinone compound represented by the formula (1) and optionally comprises another yellow dichroic dye) in the composition of the present invention is not particularly limited, but it may be preferably 0.5 to 10 parts by mass, and more preferably 2 to 7 parts by mass, based on 100 parts by mass of the liquid crystal material. The content ratio may be even more preferably 2 to 5 parts by mass or 2 to 4 parts by mass. When a dichroic dye other than yellow (described later) is used in combination, the total content of the yellow dichroic dye and the dichroic dye other than yellow may be preferably within the above range (e.g., 0.5 to 10 parts by mass).

The liquid crystal material contained in the composition of the present invention is not particularly limited as long as it is a material having liquid crystallinity (compound having liquid crystallinity) such as nematic liquid crystal, cholesteric liquid crystal, or smectic liquid crystal. Examples of the compound having liquid crystallinity include liquid crystal compounds described in Items 154 to 192 and Items 715 to 722 of "Liquid Crystal Device Handbook" (edited by the 142nd Committee of the Japan Society for the Promotion of Science, The Nikkan Kogyo Shimbun, Ltd., 1989).

The photocurable compound that can be used in combination in the composition of the present invention is not particularly limited as long as it is a compound having a functional group(s) (one or more in one molecule) that can be polymerized by the action of a photopolymerization initiator described later when irradiated with light. As the photocurable compound, both of a monofunctional monomer having one polymerizable functional group in one molecule and a bifunctional monomer having two polymerizable functional groups are preferably used in combination.

Examples of the compound having a functional group that can be polymerized by the action of the photopolymerization initiator include a compound having a (meth)acrylate group, a compound having a vinyl group, and a compound having an allyl group, and a compound having a (meth)acrylate group is preferable. That is, it is more preferable to use in combination both a mono(meth)acrylate compound having one (meth)acrylate group in one molecule and a di(meth)acrylate compound having two (meth)acrylate groups in one molecule.

It is noted that, in the present description, the term "(meth)acrylate" means "methacrylate and/or acrylate".

As the mono(meth)acrylate compound, a mono(meth)acrylate having a C5-13 linear or branched alkyl group is preferable. Specific examples thereof include: linear alkyl mono(meth)acrylates such as pentyl (meth)acrylate, hexyl (meth)acrylate, heptyl (meth)acrylate, octyl (meth)acrylate, nonyl (meth)acrylate, decyl (meth)acrylate, undecyl (meth)acrylate, dodecyl (meth)acrylate, and tridecyl (meth)acrylate, and branched alkyl mono(meth)acrylates such as 2-methylhexyl (meth)acrylate, 2-ethylhexyl (meth)acrylate, 2-propylhexyl (meth)acrylate, 2-methylheptyl (meth)acrylate, 2-ethylheptyl (meth)acrylate, 2-propylheptyl (meth)acrylate, and isobornyl (meth)acrylate.

As the di(meth)acrylate compound, for example, 1,4-butanediol di(meth)acrylate, 1,5-pentanediol di(meth)acrylate, 1,6-hexanediol di(meth)acrylate, 1,7-heptanediol di(meth)acrylate, 1,8-octanediol di(meth)acrylate, 1,9-nonanediol di(meth)acrylate, 1,10-decanediol di(meth)acrylate, 1,11-undecanediol di(meth)acrylate, 1,12-dodecanediol di(meth)acrylate, 1,13-tridecanediol di(meth)acrylate, and triethylene glycol di(meth)acrylate may be suitably used.

When the mono(meth)acrylate compound and the di(meth)acrylate compound are used in combination in the composition of the present invention, the mass ratio of the mono(meth)acrylate compound:the di(meth)acrylate compound may be preferably 0.5:9.5 to 9.5:0.5, and more preferably 5:5 to 9:1.

The photopolymerization initiator that can be used in combination in the composition of the present invention is not particularly limited as long as it is a compound capable of polymerizing a photocurable compound by light irradiation. The photopolymerization initiator is preferably one that does not remain in the cured product of the liquid crystal composition after light irradiation and does not cause deterioration of the dichroic dye or the like.

As the photopolymerization initiator, for example, alkylphenone-based photopolymerization initiators, such as DAROCUR 1173, IRGACURE 651, and IRGACURE 184, and phosphine oxide-based photopolymerization initiators, such as IRGACURE TPO, are preferably used (all of which are manufactured by BASF).

In the composition of the present invention, the blending ratio of the total of the yellow dichroic dye including the anthraquinone compound represented by the formula (1) and the liquid crystal material to the photocurable compound is preferably 90:10 to 50:50 in mass ratio, more preferably 80:20 to 50:50, and even more preferably 60:40 to 50:50. When the blending ratio of the photocurable compound is set within the above range, it is possible to prevent separation of the liquid crystal material and the photocurable compound before curing by light irradiation as well as lowering of the light shielding property of the cured product.

In addition, it is noted that the blending ratio of the total of all the dichroic dyes and liquid crystal materials contained in the composition of the present invention to the photocurable compound, including the case where a dichroic dye other than yellow is used in combination, is preferably within the above range (90:10 to 50:50 in mass ratio), and the more preferred range and the even more preferred range are also the same as those described above.

The content of the photopolymerization initiator in the liquid crystal composition of the present invention is preferably about 0.1 to 5 parts by mass based on 100 parts by mass of the photocurable compound.

The liquid crystal composition of the present invention may (or may not) contain in combination, in addition to the yellow dichroic dye of the present invention, the liquid crystal material, the photocurable compound, and the photopolymerization initiator, for example, a dichroic dye other than yellow such as a red dichroic dye and a blue dichroic dye, an optically active substance that shows or does not show a liquid crystal phase such as a cholesteryl nonanoate, a light stabilizer such as a benzotriazole type, a benzophenone type, or a hindered amine type, an antioxidant such as a phosphite type or a hindered phenol type, a thermal polymerization inhibitor, a thiol compound, a photosensitizing agent, a photosensitizer, an ultraviolet absorber, a chain transfer inhibitor, a polymerization inhibitor, an antioxidant, an adhesiveness imparting agent, an antifoaming agent, a crosslinking agent, a surfactant, a thermosetting accelerator, a thermoplastic resin, a thermosetting resin, or a thickener such as a urethane diacrylate. It is a preferred aspect from the viewpoint of improving the contrast of the light control element at the time of light shielding that a red dichroic dye and a blue dichroic dye are used in combination to form a black liquid crystal composition for light control. In addition, in order to optimize a cell gap as the light control element, a spherical or cylindrical spacer, such as silica, glass, plastic, or ceramic, may be added. The cell gap in this case can be controlled within the range of from 2 to 100 µm.

A dichroic dye other than yellow, such as a red dichroic dye or a blue dichroic dye, which can be used in combination in the liquid crystal composition of the present invention, may be selected from, for example, an azo dye, an anthraquinone dye, a perylene dye, a quinophthalone dye, a merocyanine dye, an azomethine dye, a phthaloperylene dye, an indigo dye, an azulene dye, a dioxazine dye, and a polythiophene dye. Specific examples thereof include those described in "Dichroic dyes for Liquid Crystal Display" (A. V. Ivashchenko, CRC, 1994). Among them, an azo dye, an anthraquinone dye, a perylene dye, or a quinophthalone dye is preferably used in combination, and an anthraquinone dye is more preferably used in combination.

When a dichroic dye other than yellow is used in combination, the content of the yellow dichroic dye in all the dichroic dyes is not particularly limited as long as the effects of the present invention are not impaired. The content of the yellow dichroic dye in the case of combined use may be preferably 1 to 80% by mass, more preferably 5 to 70% by mass, and even more preferably 10 to 50% by mass.

The liquid crystal composition for light control of the present invention can be obtained by mixing and stirring the yellow dichroic dye and the liquid crystal material, which are essential components, and optional components, such as the photocurable compound and the photopolymerization initiator which may be added as necessary. The mixing and stirring may be performed, in the simplest way, by placing all the constituent components in a container and manually stirring them, but it is effective to stir them using equipment such as a magnetic stirrer.

When the liquid crystal composition of the present invention that contains the photocurable compound and the photopolymerization initiator is irradiated with light, a cured product of the liquid crystal composition for light control, in which the photocurable compound component is cured (polymerized), can be obtained. It is noted that the "cured product" in the present invention means a state in which the functional group of the photocurable compound is polymerized or copolymerized by light irradiation, and does not necessarily mean a cured product in which the anthraquinone-based dye, the liquid crystal material, or the like has contributed to the curing reaction.

A light source for the light irradiation is not particularly limited as long as it is a light source capable of emitting light having a wavelength to be absorbed by the photopolymerization initiator. Examples of the light source preferably include a high-pressure mercury lamp, a metal halide lamp, a xenon lamp, and a halogen lamp that are capable of emitting ultraviolet rays.

The light control element of the present invention can be formed by sandwiching a thin film layer, formed from the cured product of the liquid crystal composition for light control of the present invention, between a pair of substrates, at least one of which is a transparent substrate having a transparent electrode, which are disposed to face each other. Here, examples of the material of the substrate include glass, quartz, metal, metal oxide, semiconductor, ceramic, and organic polymer materials. The material of the substrate may be a composite material obtained by combining a filler, a reinforcing fiber, or the like with the materials mentioned here. The substrate may have a plate shape or a film shape.

The electrode is, for example, a conductive thin film provided on the entire surface or a part of the substrate by a coating method, a printing method, vapor deposition such as sputtering, or the like using a metal oxide, a metal, a semiconductor, an organic conductive substance, or the like. The electrode provided on the substrate can also be partially etched. In terms of efficiently producing a light control element having a large area, it is preferable to use an electrode substrate in which an ITO (indium oxide, tin oxide) electrode is formed on a transparent polymer film, such as PET, using a vapor deposition method such as sputtering, a printing method, or the like.

Wiring for connecting the electrodes to each other or connecting the electrodes and external devices may be provided on the substrate. The substrate may be, for example, a segment drive electrode substrate, a matrix drive electrode substrate, or an active matrix drive electrode substrate. Furthermore, a protective film or an orientation film made of an organic compound such as polyimide, polyamide, silicon, or a cyan compound, an inorganic compound such as $SiO_2$, $TiO_2$, or $ZrO_2$, or a mixture thereof may be provided on the surface of the electrode provided on the substrate.

EXAMPLES

Hereinafter, the present invention will be specifically described with reference to Examples. Note that the terms "part" and "%" in the present text are on a mass basis unless otherwise specified. The maximum absorption wavelength in Examples is a value measured with a spectrophotometer "UV-3150" manufactured by Shimadzu Corporation.

Example 1 (Synthesis of Compound Represented by Formula (1) of Present Invention)

(Step 1) Synthesis of Intermediate Compound Represented by Following Formula (2)

To 20 parts of DMF, 5.5 parts of 1,5-dichloroanthraquinone and 8.2 parts of potassium carbonate were added, a DMF solution of 7.5 parts of 4-hydroxybenzenethiol was added dropwise thereto at 25° C., and the mixture was stirred at the same temperature for 4 hours. The obtained reaction liquid was added to an aqueous hydrochloric acid solution, and then the mixture was filtered, washed with water, and dried in a hot air dryer at 80° C. for 24 hours to obtain 5.7 parts of an intermediate compound represented by the following formula (2) as an orange solid. The yield was 98%.

(Step 2) Synthesis of Compound of Present Invention Represented by No. 2 in Above Specific Examples After 2.3 parts of the intermediate compound represented by the formula (2) obtained in Step 1, 40 parts of dichloromethane, 0.3 parts of 4-dimethylaminopyridine, and 4.2 parts of 2-hexyldecanoic acid were mixed, a dichloromethane solution of 3.4 parts of N, N'-dicyclohexylcarbodiimide was added dropwise thereto at 25° C., and the mixture was stirred at the same temperature for 3 hours. After the reaction was completed, the solvent was distilled off under reduced pressure, methanol was added to the obtained residue, and the residue was filtered, and then dried in a hot air dryer at 80° C. for 24 hours. The obtained crude product was dissolved in toluene, passed through a short column, then the solvent was distilled off under reduced pressure, and the resultant was dried in a hot air dryer at 80° C. for 24 hours to obtain 3.5 parts of the compound represented by No. 2 in the above specific examples as an orange solid. The yield was 82%. The through-yield of Steps 1 and 2 was 80%.

Example 2 (Synthesis of Compound Represented by Formula (1) of Present Invention)

(Step 3) Synthesis of Compound of Present Invention Represented by No. 3 in Above Specific Examples After 2.3 parts of the intermediate compound represented by the formula (2) obtained in Step 1 of Example 1, 40 parts of dichloromethane, 0.3 parts of 4-dimethylaminopyridine, and 3.2 parts of 2-ethylhexanoic acid were mixed, a dichloromethane solution of 3.4 parts of N, N'-dicyclohexylcarbodiimide was added dropwise at 25° C., and the mixture was stirred at the same temperature for 3 hours. After the reaction was completed, the solvent was distilled off under reduced pressure, methanol was added to the obtained residue, and the residue was filtered, and then dried in a hot air dryer at 80° C. for 24 hours. The obtained crude product was dissolved in toluene, passed through a short column, then the solvent was distilled off under reduced pressure, and the resultant was dried in a hot air dryer at 80° C. for 24 hours to obtain 2.5 parts of the compound represented by No. 3 in the above specific examples as an orange solid. The yield was 84%. The through-yield of Steps 1 and 3 was 82%.

Comparative Example 1 (Synthesis of Comparative Example Compound)

According to the synthesis method described in H. Iwanaga et al./Journal of Molecular Structure 975 (2010) 110-114, the compound represented by No. 4 in Table 1 of Patent Literature 5 (i.e., a compound represented by the following formula (A)) was obtained. The yield was 30%. It is apparent that the symmetric compound as in the present invention can be more easily produced in a better yield.

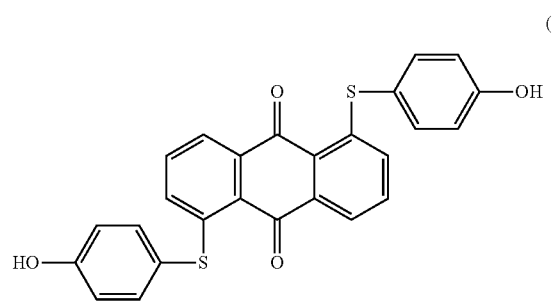

(2)

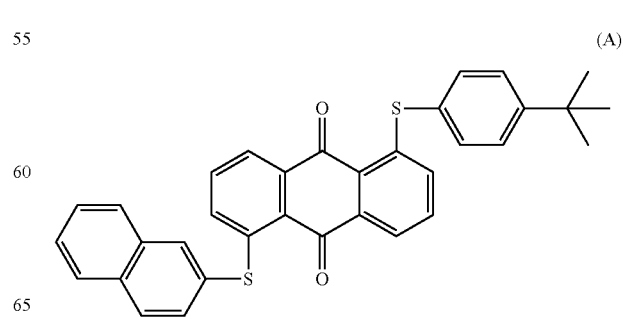

(A)

Comparative Example 2 (Synthesis of Comparative Example Compound)

Except that 11.8 parts of palmitic acid was used in place of 2-hexyldecanoic acid, the same manner as in Step 2 of Example 1 was carried out to obtain 7.8 parts of a compound represented by the following formula (B) as an orange solid.

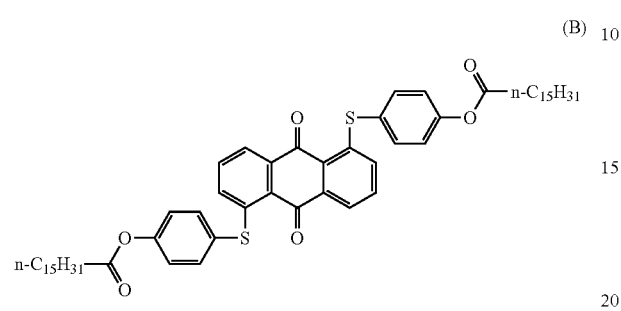

(B)

Comparative Example 3 (Synthesis of Comparative Example Compound)

Except that 5.9 parts of n-octanoic acid was used in place of 2-hexyldecanoic acid, the same manner as in Step 2 of Example 1 was carried out to obtain 3.9 parts of a compound represented by the following formula (C) as an orange solid.

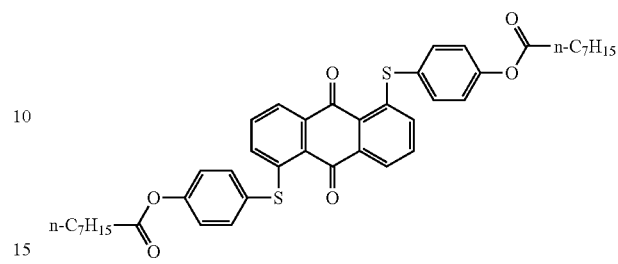

(C)

Comparative Example 4 (Synthesis of Comparative Example Compound)

Except that 6.6 parts of 3,5,5-trimethylhexanoic acid was used in place of 2-hexyldecanoic acid, the same manner as in Step 2 of Example 1 was carried out to obtain 4.4 parts of a compound represented by the following formula (D) as an orange solid.

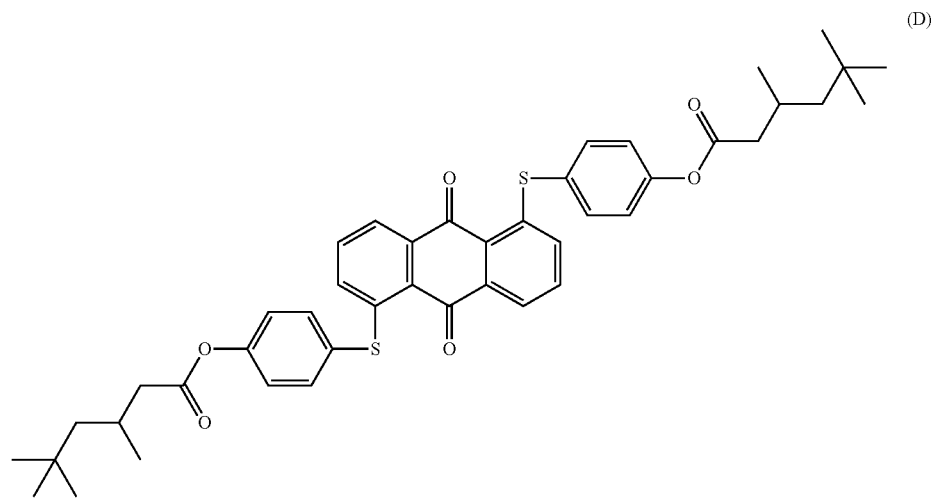 [SMILES: CC(CC(=O)Oc1ccc(Sc2cccc3c2C(=O)c2cccc(Sc4ccc(OC(=O)CC(C)CC(C)(C)C)cc4)c2C3=O)cc1)CC(C)(C)C]

(D)

Comparative Example 5 (Synthesis of Comparative Example Compound)

Except that 7.3 parts of 4-methylnonanoic acid was used in place of 2-hexyldecanoic acid, the same manner as in Step 2 of Example 1 was carried out to obtain 4.9 parts of a compound represented by the following formula (E) as an orange solid.

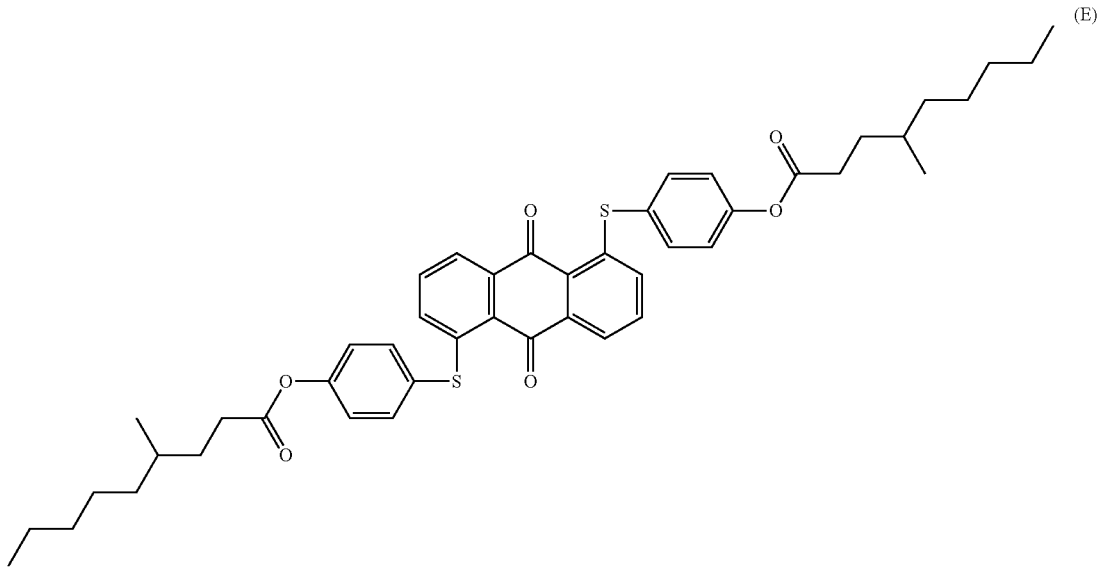 [SMILES: CCCCCC(C)CCC(=O)Oc1ccc(Sc2cccc3c2C(=O)c2cccc(Sc4ccc(OC(=O)CCC(C)CCCCC)cc4)c2C3=O)cc1]

Example 3 (Preparation of Composition of Present Invention)

By mixing, at room temperature, 0.003 parts of the compound represented by No. 2 in the specific examples obtained in Example 1 and a liquid crystal material (0.306 parts of 1-cyano-4'-n-pentylbiphenyl, 0.15 parts of 1-cyano-4'-n-heptylbiphenyl, 0.096 parts of 1-cyano-4'-n-octyloxybiphenyl, and 0.048 parts of 1-cyano-4"-n-pentylterphenyl), a liquid crystal composition of the present invention was prepared.

Example 4 and Comparative Examples 6 to 10 (Preparation of Composition of Present Invention and Compositions for Comparison)

According to Example 3 except that the compound represented by No. 2 in the specific examples obtained in Example 1 was replaced with the compound represented by No. 3 in the specific examples obtained in Example 2, the compound represented by the formula (A) obtained in Comparative Example 1, the compound represented by the formula (B) obtained in Comparative Example 2, the compound represented by the formula (C) obtained in Comparative Example 3, the compound represented by the formula (D) obtained in Comparative Example 4, and the compound represented by the formula (E) obtained in Comparative Example 5, respectively, a composition of the present invention and compositions for comparison were prepared.

Examples 5 and 6 and Comparative Examples 11 to 15 (Production of Light Control Elements According to Present Invention and Light Control Elements for Comparison)

The compositions obtained in Examples 3 and 4 and Comparative Examples 6 to 10 were each encapsulated in an element made of two upper and lower glass substrates each having a transparent electrode with an inter-substrate gap of 15 μm, in which the surface of each glass substrate in contact with a liquid crystal was rubbed with a polyamide-based resin and was subjected to a homogeneous orientation treatment. When no voltage was applied in the element subjected to the orientation treatment, the liquid crystal was in a homogeneously oriented state, and dye molecules were also in the same orientation according to the host liquid crystal.

(Evaluation of Solubilities of Compounds of Examples According to Present Invention and Compounds of Comparative Examples in Liquid Crystal Material)

To the composition obtained in Example 3, 0.003 parts of the compound represented by No. 2 was added, and the mixture was stirred at room temperature for 1 hour, and then the appearance of the composition was visually observed. When a uniform composition with no insoluble matter was obtained, a procedure of further adding 0.003 parts of the compound represented by No. 2, stirring the mixture at room temperature for 1 hour, and then visually observing the appearance of the composition was repeated until a dissolution amount (see the following) reached about 4.5% by mass. The solubility of the compound represented by No. 2 in the liquid crystal material was evaluated by the maximum addition amount at which a uniform composition with no insoluble matter was obtained. The result is shown in Table 1.

The mass ratio of the compound represented by No. 2 to the liquid crystal material in the composition of Example 3 and the dissolution amount of the compound represented by No. 2, and the mass ratio of the compound represented by No. 2 to the liquid crystal material after the further addition of the compound represented by No. 2 and the total dissolution amount of the compound represented by No. 2 are shown below.

Mass ratio and dissolution amount of the compound in Example 3: about 0.5% by mass (0.003 parts)
Mass ratio and dissolution amount of the compound after addition of 0.003 parts in total: about 1.0% by mass (0.006 parts)
Mass ratio and dissolution amount of the compound after addition of 0.006 parts in total: about 1.5% by mass (0.009 parts)
Mass ratio and dissolution amount of the compound after addition of 0.009 parts in total: about 2.0% by mass (0.012 parts)
Mass ratio and dissolution amount of the compound after addition of 0.012 parts in total: about 2.5% by mass (0.015 parts)
Mass ratio and dissolution amount of the compound after addition of 0.015 parts in total: about 3.0% by mass (0.018 parts)
Mass ratio and dissolution amount of the compound after addition of 0.018 parts in total: about 3.5% by mass (0.021 parts)
Mass ratio and dissolution amount of the compound after addition of 0.021 parts in total: about 4.0% by mass (0.024 parts)
Mass ratio and dissolution amount of the compound after addition of 0.024 parts in total: about 4.5% by mass (0.027 parts)

(Supplement) For example, when a uniform composition with no insoluble matter was obtained after a total of 0.009 parts of the compound was added and the mixture was stirred, and when an insoluble matter remained after 0.003 parts of the compound were further added and the mixture was stirred, the maximum dissolution amount was determined to be 2.0% by mass. When a uniform composition with no insoluble matter was obtained even after 0.024 parts of the compound were added, the maximum dissolution amount was provisionally determined to be "about 4.5% by mass".

In addition, by the same method as described above using, instead of the composition obtained in Example 3 that contained the compound represented by No. 2, the compositions obtained in Example 4 and Comparative Examples 6 to 10 that contained the compounds represented by No. 3 and the formulae (A) to (E), respectively, the solubilities of the compounds in the liquid crystal material were evaluated. The results are shown in Table 1.

(Evaluation of Contrasts of Compositions of Examples According to Present Invention and Compositions of Comparative Examples)

Each of the uniform compositions with no insoluble matter, which were obtained in the above-mentioned "Evaluation of Solubilities of Compounds of Examples according to Present Invention and Compounds of Comparative Examples in Liquid Crystal Material" and which were each made in the maximum dissolution amount, was encapsulated in a cell. In the cell in which each of the uniform compositions was encapsulated, a transmittance (Ky) of linearly polarized light parallel to the orientation direction and a transmittance (Kz) of polarized light perpendicular to the orientation direction were measured, and a contrast (C) at its absorption peak wavelength (λmax) was determined from the following expression. The results are shown in Table 1.

$$C = Ky/Kz$$

TABLE 1

Results of evaluation of solubility and contrast

| Compound | Maximum dissolution amount | λmax(nm) | C(Ky/Kz) |
|---|---|---|---|
| No.2 | 4.5% by mass | 460 | 19.1 |
| No.3 | 3.5% by mass | 462 | 30.9 |
| Formula(A) | 1.0% by mass | 462 | 2.2 |
| Formula(B) | 1.0% by mass | 462 | 2.0 |
| Formula(C) | 2.5% by mass | 462 | 8.6 |
| Formula(D) | 2.0% by mass | 462 | 4.2 |
| Formula(E) | 2.0% by mass | 460 | 4.0 |

As shown in Table 1, the compound of the present invention, having a branch at the α-position of the carbonyl group, had higher solubility in the liquid crystal material than the compounds of Comparative Examples, and the content of the dye compound (dichroic dye) in the liquid crystal composition for light control could be increased. Therefore, it was found that the contrast of a light control element obtained using the composition of the present invention could be increased.

Example 7 (Preparation of Composition of Present Invention)

By stirring, at room temperature for 2 hours, 0.467 parts of isobornyl acrylate (manufactured by Osaka Organic Chemical Industry, Ltd.) as a monofunctional monomer of the photocurable compound, 0.024 parts of triethylene glycol dimethacrylate (manufactured by Shin Nakamura Chemical Co., Ltd.) as a bifunctional monomer of the photocurable compound, 0.255 parts of 1-cyano-4'-n-pentylbiphenyl, 0.125 parts of 1-cyano-4'-n-heptylbiphenyl, 0.080 parts of 1-cyano-4'-n-octyloxybiphenyl, and 0.040 parts of 1-cyano-4"-n-pentylterphenyl as the liquid crystal material, 0.005 parts of IRGACURE TPO (manufactured by BASF) and 0.005 parts of IRGACURE 184 (manufactured by BASF) as the photopolymerization initiator, and 0.005 parts of the compound represented by No. 2 in the specific examples obtained in Example 1 as the yellow dichroic dye, a composition of the present invention was prepared. The content of the compound (dichroic dye) represented by No. 2 in the liquid crystal material, the photocurable compound, and the photopolymerization initiator was about 0.5 mass %.

Example 8 and Comparative Examples 16 to 20 (Preparation of Liquid Crystal Composition of Present Invention and Liquid Crystal Compositions for Comparison)

According to Example 7 except that the compound represented by No. 2 in the above specific examples obtained in Example 1 was replaced with the compound represented by No. 3 in the above specific examples obtained in Example 2, the compound represented by the formula (A) obtained in Comparative Example 1, the compound represented by the formula (B) obtained in Comparative Example 2, the compound represented by the formula (C) obtained in Comparative Example 3, the compound represented by the formula (D) obtained in Comparative Example 4, and the compound represented by the formula (E) obtained in Comparative Example 5, respectively, a composition of the present invention and compositions for comparison were obtained.

(Evaluation of Solubilities of Compounds of Examples According to Present Invention and Compounds of Comparative Examples in Liquid Crystal Material, Photocurable Compound, and Photopolymerization Initiator)

To the composition obtained in Example 7, 0.005 parts of the compound represented by No. 2 was added, and the mixture was stirred at room temperature for 1 hour, and then the appearance of the composition was visually observed. When a uniform composition with no insoluble matter was obtained, a procedure of further adding 0.005 parts of the compound represented by No. 2, stirring the mixture at room temperature for 1 hour, and then visually observing the appearance of the composition was repeated until a dissolution amount (see the following) reached about 3.5% by mass. The solubility of the compound represented by No. 2 in the liquid crystal material, the photocurable compound, and the photopolymerization initiator was evaluated by the maximum addition amount at which a uniform composition with no insoluble matter was obtained. The result is shown in Table 2.

The mass ratio and the dissolution amount of the compound represented by No. 2 in the liquid crystal material, the photocurable compound, and the photopolymerization initiator in Example 7, and the mass ratio of the compound represented by No. 2 in the liquid crystal material, the photocurable compound, and the photopolymerization initiator after the further addition of the compound represented by No. 2 and the total dissolution amount of the compound represented by No. 2 are shown below.

Mass ratio and dissolution amount of the compound in Example 7: about 0.5% by mass (0.005 parts by mass)
Mass ratio and dissolution amount of the compound after addition of 0.005 parts in total: about 1.0% by mass (0.010 parts by mass)
Mass ratio and dissolution amount of the compound after addition of 0.010 parts in total: about 1.5% by mass (0.015 parts by mass)
Mass ratio and dissolution amount of the compound after addition of 0.015 parts in total: about 2.0% by mass (0.020 parts by mass)
Mass ratio and dissolution amount of the compound after addition of 0.020 parts in total: about 2.5% by mass (0.025 parts by mass)
Mass ratio and dissolution amount of the compound after addition of 0.025 parts in total: about 3.0% by mass (0.030 parts by mass)
Mass ratio and dissolution amount of the compound after addition of 0.030 parts in total: about 3.5% by mass (0.035 parts by mass)

(Supplement) For example, when a uniform composition with no insoluble matter was obtained after a total of 0.020 parts of the compound was added and the mixture was stirred, and when an insoluble matter remained after 0.005 parts of the compound were further added and the mixture was stirred, the maximum dissolution amount was determined to be 2.5% by mass. When a uniform composition with no insoluble matter was obtained even after 0.030 parts of the compound were added, the maximum dissolution amount was provisionally determined to be "about 3.5% by mass".

In addition, by the same method as described above using, instead of the composition that contained the compound represented by No. 2 obtained in Example 7, the compositions that contained the compounds represented by No. 3 and the formulae (A) to (E) obtained in Example 8 and Comparative Examples 16 to 20, respectively, the solubilities of the compounds in the liquid crystal material, the photocurable compound, and the photopolymerization initiator were evaluated. The results are shown in Table 2.

Examples 9 and 10 and Comparative Examples 21 to 25 (Production of Light Control Elements of Present Invention and Light Control Elements for Comparison)

With the uniform compositions each having a maximum dissolution amount with no insoluble matter obtained in the above "Evaluation of Solubilities of Compounds of Examples according to Present Invention and Compounds of Comparative Examples in Liquid Crystal Material. Photocurable Compound, and Photopolymerization Initiator", 0.010 parts of a spacer agent (Micropearl (registered trademark) SP220 manufactured by SEKISUI CHEMICAL CO., LTD.) having a diameter of 20 μm was mixed at room temperature. After the composition containing the spacer agent was applied onto an ITO film of a 5 cm square PET film provided with the ITO film by an applicator, a 5 cm square PET film provided with the same ITO film as above was superimposed such that the composition layer provided on the ITO film obtained above faced the other ITO film. The laminate of the two films and the composition that was obtained above was placed at a position where the light intensity at 365 nm of an LED lamp was 9 mW/cm$^2$ while the temperature was maintained at 23° C. on a thermoplate. Each of light control elements of the present invention and light control elements for comparison was obtained by being irradiated with light for 1 minute to cure the photocurable compound.

(Spectral Properties of Light Control Elements)

For the light control elements obtained in Examples 9 and 10 and Comparative Examples 21 to 25, the value of transmittance T (0 V) at the absorption peak wavelength (λmax), occurring when no voltage was applied, was measured by a spectrophotometer. The results are shown in Table 2.

TABLE 2

Results of evaluation of solubility and transmittance

| Compound | Maximum dissolution amount | T (0 V) |
| --- | --- | --- |
| No.2 | 3.5% by mass | 12.8 |
| No.3 | 3.5% by mass | 8.8 |
| Formula(A) | 0.5% by mass | 54.0 |
| Formula(B) | 0.5% by mass | 55.4 |
| Formula(C) | 0.5% by mass | 53.3 |
| Formula(D) | 1.0% by mass | 44.1 |
| Formula(E) | 1.0% by mass | 43.8 |

As shown in Table 2, the compounds of the present invention, each having a branch at the α-position of the carbonyl group, had higher solubility in the liquid crystal material, the photocurable compound, and the photopolymerization initiator than the compounds of Comparative Examples, and the contents of the dye compound (dichroic dye) in the liquid crystal composition for light control could be increased. Therefore, it was found that the light control elements obtained using the composition of the present invention has a lower transmittance at the absorption peak wavelength (λmax), occurring when no voltage is applied (light is shielded by the light control element) as compared with the light control elements of Comparative Examples, and can increase the contrast.

Example 11 (Production of Black Light Control Element)

By mixing, at room temperature, 0.013 parts of the compound (yellow dichroic dye) represented by No. 2 in the specific examples obtained in Example 1, 0.007 parts of a blue dichroic dye represented by the following formula (X), 0.006 parts of a red dichroic dye represented by the following formula (Y), 0.467 parts of isobornyl acrylate (a monoacrylate manufactured by OSAKA ORGANIC CHEMICAL INDUSTRY, LTD.), 0.024 parts of triethylene glycol dimethacrylate (manufactured by SHIN-NAKAMURA CHEMICAL Co., Ltd.), 0.255 parts of 1-cyano-4'-n-pentylbiphenyl, 0.125 parts of 1-cyano-4'-n-heptylbiphenyl, 0.080 parts of 1-cyano-4'-n-octyloxybiphenyl, 0.040 parts of 1-cyano-4"-n-pentylterphenyl, 0.005 parts of IRGACURE TPO (manufactured by BASF), 0.005 parts of IRGACURE 184 (manufactured by BASF), and 0.010 parts of a spacer agent having a diameter of 20 μm (Micropearl (registered trademark) SP220 manufactured by SEKISUI CHEMICAL CO., LTD.), a liquid crystal composition for light control according to the present invention was prepared. The liquid crystal composition for light control was applied onto an ITO film of a 5 cm square PET film provided with the ITO film by using an applicator, and a 5 cm square PET film provided with the same ITO film as above was superimposed such that the composition layer on the ITO film faced the other ITO film. Then, the sample was placed at a position where the light intensity at 365 nm of an LED lamp manufactured by AITEC SYSTEM Co., Ltd. was 9 mW/cm² such that the temperature of the sample was maintained at 23° C. on a thermoplate, and the sample was irradiated with light for 1 minute to cure the photocurable compound component, thereby obtaining a black light control element.

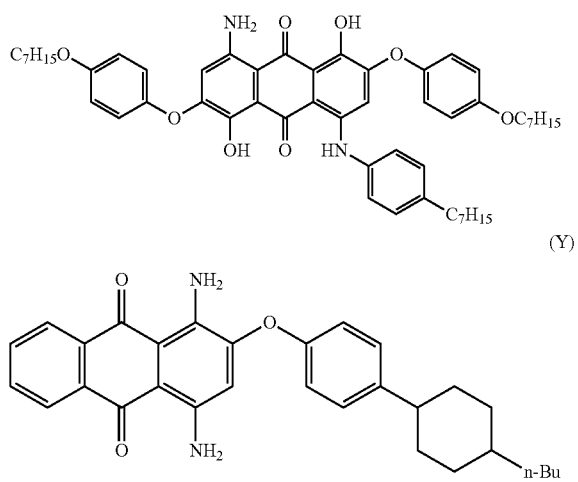

(X)

(Y)

Example 12 (Production of Black Light Control Element)

Except that the compound (yellow dichroic dye) represented by No. 3 in the specific examples obtained in Example 2 was used in place of the compound represented by No. 2 in the specific examples, the same manner as in Example 11 was carried out to obtain a black light control element.

INDUSTRIAL APPLICABILITY

The liquid crystal composition for light control of the present invention can stably maintain a high dye concentration at room temperature and low temperatures, and a light control element excellent in solubility and contrast can be obtained by using the composition. The light control element obtained by the present invention can be used for: building materials such as windows, partitions, and doors; in-vehicle materials such as windows and sunroofs; and materials for exhibits, such as displays and show windows for displaying characters, numbers, and the like, for example.

The invention claimed is:

1. A compound represented by formula (1):

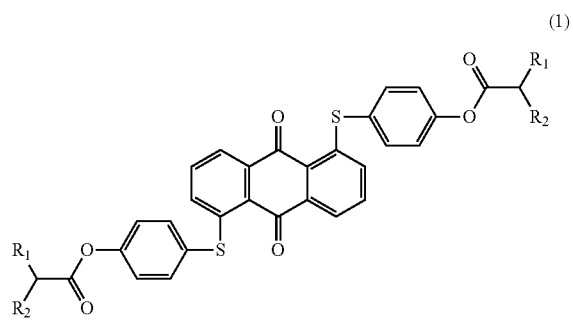

(1)

wherein $R_1$ represents a C1-9 alkyl group and $R_2$ represents a C1-8 alkyl group.

2. The compound according to claim 1, wherein a total of the number of carbon atoms in the alkyl group represented by $R_1$ and the number of carbon atoms in the alkyl group represented by $R_2$ is 6 to 14.

3. The compound according to claim 2, wherein $R_1$ is a C4-8 alkyl group and $R_2$ is a C2-6 alkyl group.

4. A liquid crystal composition for light control, comprising a yellow dichroic dye represented by the formula (1) according to claim 1 and a liquid crystal material.

5. The liquid crystal composition for light control according to claim 4, further comprising a photocurable compound and a photopolymerization initiator.

6. The liquid crystal composition for light control according to claim 4, further comprising a red dichroic dye and a blue dichroic dye.

7. A cured product of the liquid crystal composition for light control according to claim 5.

8. A light control element in which the liquid crystal composition for light control according to claim 4 is sandwiched between a pair of substrates, at least one of which is a transparent substrate having a transparent electrode.

9. The light control element according to claim 8, wherein both of the pair of substrates are transparent substrates having a transparent electrode.

10. The liquid crystal composition for light control according to claim 5, further comprising a red dichroic dye and a blue dichroic dye.

11. A light control element in which the cured product according to claim 7 is sandwiched between a pair of substrates, at least one of which is a transparent substrate having a transparent electrode.

12. The light control element according to claim 11, wherein both of the pair of substrates are transparent substrates having a transparent electrode.

13. The light control element according to claim 8, which is used for being mounted on a vehicle.

14. The light control element according to claim 9, which is used for being mounted on a vehicle.

15. The light control element according to claim 8, which is used for a building material.

16. The light control element according to claim 9, which is used for a building material.

* * * * *